(12) United States Patent
Cnossen (10) Patent No.: US 8,313,658 B2
(45) Date of Patent: Nov. 20, 2012

(54) COMBINED GAS REMOVAL, DIRT REMOVAL AND CONTAMINATING LIQUID REMOVAL DEVICE

(75) Inventor: Jan Henk Cnossen, Koudum (NL)

(73) Assignee: Flamco B.V., Gouda (NL)

( * ) Notice: Subject to any disclaimer, the term of this patent is extended or adjusted under 35 U.S.C. 154(b) by 329 days.

(21) Appl. No.: 12/708,035

(22) Filed: Feb. 18, 2010

(65) Prior Publication Data

US 2010/0236409 A1     Sep. 23, 2010

(30) Foreign Application Priority Data

Mar. 20, 2009   (NL) ...................................... 2002648

(51) Int. Cl.
*B01D 17/025*    (2006.01)
*B01D 21/02*     (2006.01)
*B01D 19/00*     (2006.01)

(52) U.S. Cl. ..................... 210/801; 210/521; 210/532.1; 210/539; 210/540; 210/DIG. 5; 95/253; 95/260; 96/182; 96/204

(58) Field of Classification Search ................... 210/801, 210/802, 521, 522, 532.1, 538, 539, 540, 210/DIG. 5; 95/253, 260; 96/182, 204
See application file for complete search history.

(56) References Cited

U.S. PATENT DOCUMENTS

| 4,151,087 | A  | * | 4/1979  | Sakaguchi ............... 210/DIG. 5 |
| 4,802,978 | A  | * | 2/1989  | Schmit et al. ................. 210/521 |
| 5,518,610 | A  | * | 5/1996  | Pierpoline .................... 210/540 |
| 5,858,252 | A  | * | 1/1999  | Darcy ......................... 210/532.1 |
| 7,008,546 | B2 | * | 3/2006  | Edmondson ................... 210/801 |
| 7,083,736 | B1 | * | 8/2006  | Hirs ............................... 210/539 |
| 7,287,651 | B2 | * | 10/2007 | Myers et al. ............. 210/DIG. 5 |
| 2005/0155925 | A1 |   | 7/2005  | Schipper |

FOREIGN PATENT DOCUMENTS

| DE | 4017229 | 12/1990 |
| WO | 9710037 | 3/1997 |

* cited by examiner

*Primary Examiner* — Christopher Upton
(74) *Attorney, Agent, or Firm* — Hoffmann & Baron, LLP (57) ABSTRACT

The present invention relates to a removal device for removing gas, dirt and/or particles from a contaminating liquid from a liquid in a liquid conduit system. The removal device includes a housing, a supply opening and a discharge opening, a resistance zone, at least one quiet zone and at least one return opening. The quiet zone allows dirt and/or particles of a relatively heavy contaminating liquid to settle to a bottom of the housing, and/or gas bubbles and/or particles of a relatively light contaminating liquid to rise to an upper end of the housing at least one bifurcation opening in the resistance zone and subsequently returns into the main flow at the merge point through the return opening.

24 Claims, 8 Drawing Sheets

COMBINED GAS REMOVAL, DIRT REMOVAL AND CONTAMINATING LIQUID REMOVAL DEVICE

CROSS-REFERENCE TO RELATED APPLICATIONS

This application claims the benefit of Netherlands Application No. 2002648, filed Mar. 20, 2009, the contents of which are incorporated herein by reference.

TECHNICAL FIELD

The present invention relates to a removal device for removing air, gas or micro bubbles, particles of a contaminating liquid and/or and dirt from a liquid in a closed liquid conduit system. These devices are known in the field of the art.

BACKGROUND ART

In liquid conduit systems, it is often important that gasses are removed from the liquid in the conduit system. These gasses generally occur as free gasses or absorbed by the liquid. This is in particular important in conduits for heating systems, but may also be important in other situations. For this purpose, gas removal devices have been developed.

Further, it is often desired that dirt parts are removed from the liquid inside the conduit system. These dirt parts may come loose from the inner walls of the conduits. Due to the flow of the liquid inside the conduit system, the dirt particles may be held in suspension.

If these dirt parts are not removed, they may clog up the conduit system or damage certain components in the conduit system, such as pumps.

Also, particles of other liquids may contaminate the main liquid in a conduit system. The contaminating liquid may be lighter or heavier than the main liquid.

In the prior art, it is known to use a separate gas removal device and dirt removal device. However, this is relatively costly and not very practical.

A combined gas removal and dirt removal device is known from WO97/10037. This device has a gas removal element and a quiet zone below the gas removal element. In the quiet zone, dirt should come to rest and settle on the bottom.

A problem associated with the device of WO97/10037 is that e dirt removal function does not work very well. The liquid does not become calm enough to allow dirt parts or particles from a heavy contaminating liquid to settle.

In the conduit system, the liquid has a substantial speed. This speed needs to be substantially reduced in the quiet zone, in order to allow the dirt parts or particles from a heavy contaminating liquid to settle. It is in particular difficult to remove the smaller particles under 50 microns from the liquid. Another requirement is that a substantial discharge should be directed through the quiet zone, because otherwise the part of the flow which is cleaned is too small to affect the dirt level or level of particles from a heavy contaminating liquid in the total flow.

It was found that the device of WO97/10037 does not succeed enough in reducing the velocity of the liquid at any acceptable resistance of flow. The dirt parts or particles from a heavy contaminating liquid are substantially held in suspension and do not settle to the bottom of the quiet zone. Furthermore, the flow of the liquid remains substantially turbulent, i.e. variable in time, which further contributes to the dirt particles or particles from a heavy contaminating liquid being held in suspension.

A possible solution could be to substantially increase the size of the quiet zone. However, in practice a device of limited size is desired in the field, for cost reasons and also because devices of limited size are more practical during installation. A substantial increase in the size of the apparatus would lead to an apparatus of impractical size.

DE4017229 further discloses a device for removing contaminations from liquids in a liquid conduit system. The device of DE4017229 also does not provide satisfactory results. Rather than to settle to the bottom, the dirt tends to be conveyed with the main flow through the device. The gas bubble also tend to be conveyed through the device, rather than to be removed. The device according to DE4017229 is also quite large, which is not very practical in many situations.

SUMMARY OF THE INVENTION

It is a goal of the invention to provide an alternative to the prior art.

It is a goal of the invention to provide a removal device which can effectively remove gas and/or dirt and/or particles from a contaminating liquid from a liquid conduit system.

It is a further goal to provide a combined gas removal and/or dirt removal and/or contaminating liquid removal device that effectively removes gas and/or dirt or particles from a contaminating liquid and has a limited size.

It is a further goal of the invention to provide a combined gas removal and dirt and contaminating liquid removal device that is capable of substantially reducing a velocity of a liquid inside a conduit system.

It is a further goal of optimising the dirt removal function, gas removal function and contaminating liquid removal function with a low resistance, in order to limit energy loss.

In order to achieve at least one object, the invention provides a removal device for removing gas and/or dirt and/or particles of a contaminating liquid from a liquid in a liquid conduit system, the removal device comprising:

a housing which defines an inner space, a supply opening and a discharge opening in the housing, a resistance zone in the inner space comprising an entrance and an exit and one or more flow resistance members, which resistance zone in use provides a hydraulic resistance to a main flow which flows from the supply opening through the resistance zone to the discharge opening, at least one quiet zone in the inner space in which in use the liquid has a substantially smaller velocity than in the resistance section, the quiet zone being configured to allow:

a. dirt or particles of a relatively heavy contaminating liquid to settle to a bottom of the housing, or b. gas bubbles or particles of a relatively light contaminating liquid to rise to an upper end of the housing at least one bifurcation opening in the resistance zone, the bifurcation opening being in liquid communication with the quiet zone and providing entry for a branch-off flow into the quiet zone, at least one return opening between the quiet zone and a merge point in the main flow upstream and/or downstream from the resistance zone, the return opening allowing a return of the branch flow into the main flow, such that in use the branch-off flow enters the quiet zone through the bifurcation opening, substantially comes to rest in the quiet zone in order to allow dirt or particles of a relatively heavy contaminating liquid to settle or gas bubbles or particles of a relatively light contaminating liquid to rise and subsequently returns into the main flow at the merge point through the return opening.

Because the quiet zone has a separate entrance and exit, a relatively calm and stable flow pattern is achieved. Substantially low velocities are possible, resulting in relatively effective dirt removal or removal of particles of a relatively heavy contaminating liquid and/or effective rising of gas bubbles or rising of particles of a relatively light contaminating liquid.

Generally, the branch flow into the quiet zone will have a different direction than a main ongoing flow. In an embodiment, the branch flow is oriented at right angles to the main ongoing flow. The main ongoing flow may be oriented horizontally, while the branch flow may be oriented substantially vertically.

In an embodiment, the removal device comprises both a quiet zone for dirt removal and removal of particles of a relatively heavy contaminating liquid and a quiet zone for gas removal and removal of particles of a relatively heavy contaminating liquid. A single combined resistance zone may be provided for both the quiet zone for dirt removal and the quiet zone for gas removal. However, it is also possible that each quiet zone has a respective resistance zone.

The present invention may also be used to clean contaminated liquids, wherein the contamination relates to other liquids. For instance, thermal oil may be cleaned which comprises volatile components. Thermal oil is used in heating systems, often in situations wherein the working temperature is above 100 degrees Celsius. In such a situation, the use of water would require high pressures and devices capable of handling such high pressures. With thermal oil, substantially lower pressures can be used in these temperature ranges.

U.S. Pat. No. 5,820,648 and GB2375056 disclose systems for cleaning such thermal oil. However, these systems include a vaporisation chamber for the main liquid, i.e. the thermal oil, a condenser and other substantially complicated parts. These parts make the systems as a whole quite complex and cumbersome.

The present invention provides a much simpler solution, i.e. without a vaporisation chamber for the main liquid.

In an embodiment, the quiet zone for dirt removal or removal of particles of a relatively heavy contaminating liquid is located under the resistance zone and the quiet zone for gas removal and removal of particles of a relatively light contaminating liquid is located above the resistance zone.

The relatively light component may a volatile contaminant in thermal oil, or a different contaminating liquid in a different main liquid.

In an embodiment, one or more flow guides are provided in the housing which define he at least one bifurcation opening and the at least one return opening and which substantially determine a flow pattern of the liquid through the one or more quiet zones.

In an embodiment, the removal device comprises one or more flow guides which define a separate bifurcation opening and at least one separate return opening.

In an embodiment, the one or more flow guides are plates which are mounted in the inner space.

In an embodiment, the removal device comprises a quiet zone for dirt removal or removal of particles of a relatively heavy contaminating liquid, wherein the one or more flow guides in the quiet zone define:

one or more downward flow sections which start at the bifurcation point and in which the flow is directed downward.

one or more upward flow sections which in use have an upward flow and which end at the merge point, in such a way that in use the liquid enters the quiet zone for dirt removal or removal of particles of a relatively heavy contaminating liquid through the downward flow section and exits the quiet zone for dirt removal or removal of particles of a relatively heavy contaminating liquid through the upward flow section.

In an embodiment, the removal device comprises a quiet zone for the rising of gas bubbles or rising of particles of a relatively light contaminating liquid, wherein the one or more flow guides in the quiet zone define:

one or more upward flow sections which start at the bifurcation point and which in use have an upward flow, one or more downward flow sections which in use have a downward flow and which end at the merge point, in such a way that in use the liquid enters the quiet zone for the rising of gas bubbles or the rising of particles of a relatively light contaminating liquid through the upward flow section, comes to rest in the quiet zone and subsequently exits the quiet zone through the downward flow section.

In another embodiment, when viewed from above the one or more return openings substantially form an annulus which extends substantially around the bifurcation opening, wherein the flow guides separate the one or more return openings from the bifurcation opening.

In this way, an inner downward flow is created for entry into the quiet zone and an outer upward flow is created for exit from the quiet zone.

In an embodiment:

the one or more flow guides of the quiet zone for dirt removal or removal of particles of a relatively heavy contaminating liquid have a lower edge which is located at a distance from a bottom of the housing, such that the quiet zone is defined below the lower edge of the one or more flow guides and/or the one or more flow guides of the quiet zone for the rising of gas bubbles or rising of particles of a relatively light contaminating liquid have an upper edge which is located at a distance from an upper end of the housing, such that the quiet zone for the bubbles is defined above the upper edge of the one or more flow guides.

In an embodiment, the one or more flow guides define an entrance flow section from the bifurcation point into the quiet zone, wherein the cross-sectional area of the entrance flow section increases in the direction of flow.

In another embodiment, the one or more flow guides define one or more return flow sectional from the quiet zone to the merge point, wherein the cross-sectional area of the one or more return flow section increases in the direction of flow.

In an embodiment, the flow guides are plates which taper outwardly from the bifurcation point in the direction of flow.

In an embodiment, in the inner space:

an approach zone is defined between the supply opening and the resistance zone by a wall of the housing and an entry side of the resistance zone, in which approach zone in use the liquid approaches the resistance zone, a leaving zone is defined between the resistance zone and the discharge opening by a wall of the housing and an exit side of the resistance zone, in which leaving zone in use the liquid flows away from the resistance zone, wherein the cross-sectional flow area in the approach zone and/or in the leaving zone is smaller than in the resistance zone, such that in use the velocity of the liquid in the approach zone and the leaving zone is greater than the velocity in the resistance zone, resulting in a higher hydrostatical pressure in the resistance zone than in the approach zone and/or the leaving zone.

Bernoulli's principle dictates that a decrease in velocity results in an increase in hydrostatical pressure. Thus, the hydrostatical pressure in the resistance zone is higher than in the approach zone and in the leaving zone. This results in the forming of the flow through the quiet zone, i.e. the flow enters the quiet zone from the resistance zone where the hydrostatical pressure is high. The flow flows through the quiet zone and into the approach zone or leaving zone where the hydrostatical pressure is relatively low.

In another embodiment, the flow guides define:
the bifurcation opening into the quiet zone for dirt removal or removal of particles of a relatively heavy contaminating liquid at an underside of the resistance zone, and/or
the bifurcation opening into the quiet zone for the rising of gas bubbles or rising of particles of a relatively light contaminating liquid at an upper side of the resistance zone.

In an embodiment, the one or more flow guides define at least one return opening between an edge of the flow guide and a side wall of the housing.

In an embodiment, when viewed from above the resistance zone comprises:
a widening part in which the cross-sectional area of the flow increases in the direction of the flow, and
a narrowing part in which the cross-sectional area of the flow decreases in the direction of the flow.

In an embodiment, when viewed from above the resistance zone is substantially rhombic, wherein one corner of the rhombus form is substantially directed at the supply opening and another corner is substantially directed at the discharge opening.

This allows a simple geometrical form to be inserted in a substantially cylindrical form of the housing and define an entrance and an exit to the quiet zone in a simple way. Other advantages may also be present.

In another embodiment, the one or more resistance members are bubble-forming members which comprise a relatively large surface area onto which gasses in the liquid may attach and form bubbles.

In an embodiment, the removal device comprises a plurality of return openings, wherein at least one return opening is provided upstream of the bifurcation point and wherein at least one return opening is provided downstream of the bifurcation point.

In an embodiment, the removal device comprises one or more return openings, wherein the one or more return opening is only provided downstream of the bifurcation point.

The present invention further relates to a resistance element constructed to be placed inside the removal device according to claim 1 in order to form the resistance zone, the resistance element comprising:
one or more resistance members which define a resistance zone,
one or more flow guides which define a bifurcation point from the resistance zone, wherein when the resistance element is inside the removal device, the flow guides define at least one quiet zone in conjunction with the wall of the removal device, the quiet zone having a separate entrance and a separate exit.

The present invention also relates to a method for:
a) removing gas or particles of a relatively light contaminating liquid from a liquid in a liquid conduit system and/or
b) removing dirt or particles of a relatively heavy contaminating liquid from the liquid in the liquid conduit system,
the method comprising providing a removal device according to claim 1 and guiding a flow of liquid through the removal device.

In an embodiment, the present invention may also be referred to as a combined gas and dirt and contaminating liquid remover.

The invention is explained in more detail in the text, which follows with reference to the drawing, which shows a number of embodiments, which are given purely by way a non-limiting examples.

DETAILED DESCRIPTION OF THE DRAWINGS

Turning to FIGS. 1-4, 9 and 10, a combined air and dirt and contaminating liquid removal device 10 according to the invention is shown. Wherever the word "air" is used, it will be understood that other gasses may also be removed.

The device 10 comprises a housing 12, a liquid entrance 14 and a liquid exit 16. The liquid entrance 14 and the liquid exit 16 are constructed such that the device can be mounted in-line in a liquid conduit system not shown). The entrance 14 goes over in a supply opening 15 in the housing 12 via a tube 11. The exit 16 goes over in a discharge opening 17 in the housing 12 via a tube 11 The housing defines an inner space 13. The surface area of the housing is larger than the surface area of the tubes 11.

At a bottom side 18 of the device 10, a dirt exit 20 is provided. The dirt exit 20 comprises a valve (not shown) configured to be opened and closed. The bottom side 18 is substantially conical, such that the bottom side 18 slopes toward the dirt exit 20. The dirt exit 18 can also he used for removing particles of a relatively heavy contaminating liquid.

At an upper side 22 of the device 10, an air outlet 24 is provided which is constructed to enable air to be released from the device 10. The air outlet 24 may also be capable of enabling particles of a relatively light contaminating liquid to be released. For this purpose, a tap may be provided. Other outlets may also be used.

The device 10 has a substantially circular form, when viewed in top view. Other forms are also possible. A side wall 26 of the device 10 is substantially circular. The supply opening 15 and the discharge opening 17 are provided in the side wall 26.

Figure 1:
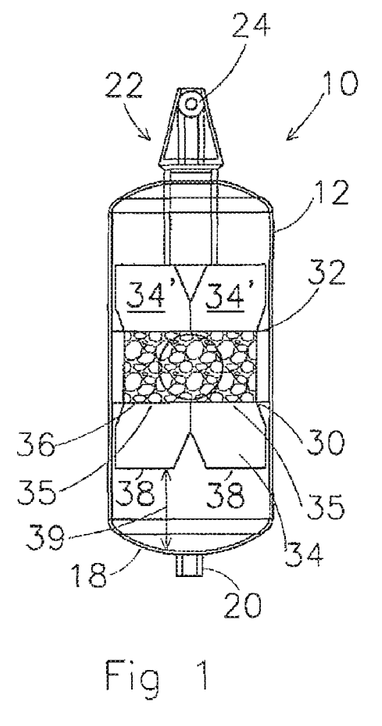
FIG. 1 shows a diagrammatical front view in cross-section of the device according to the invention.
Figure 2:
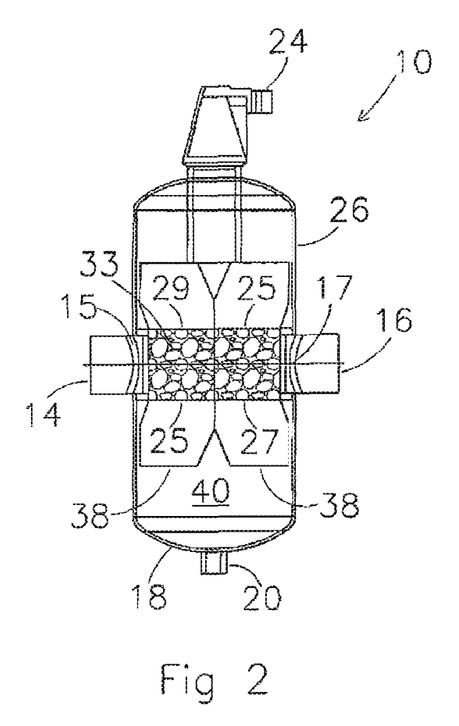
FIG. 2 shows a diagrammatical side view in cross-section of the device according to the invention.
Figure 3:
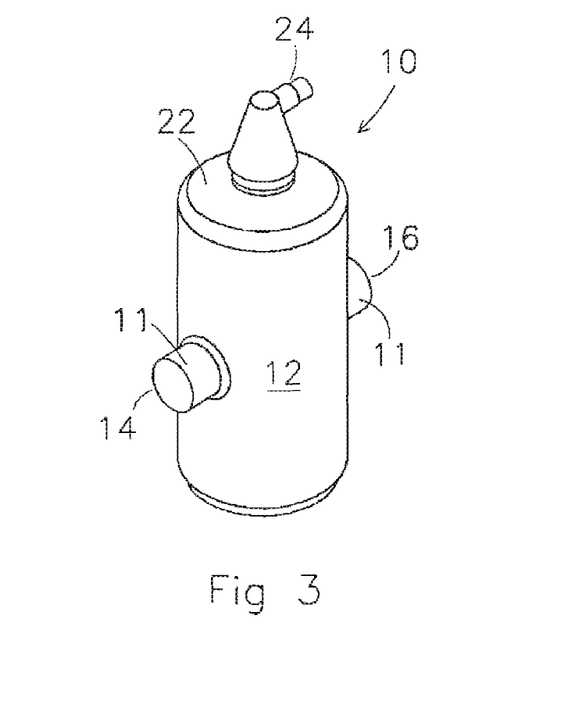
FIG. 3 shows a diagrammatical orthogonal view of the device according to the invention.
Figure 4:
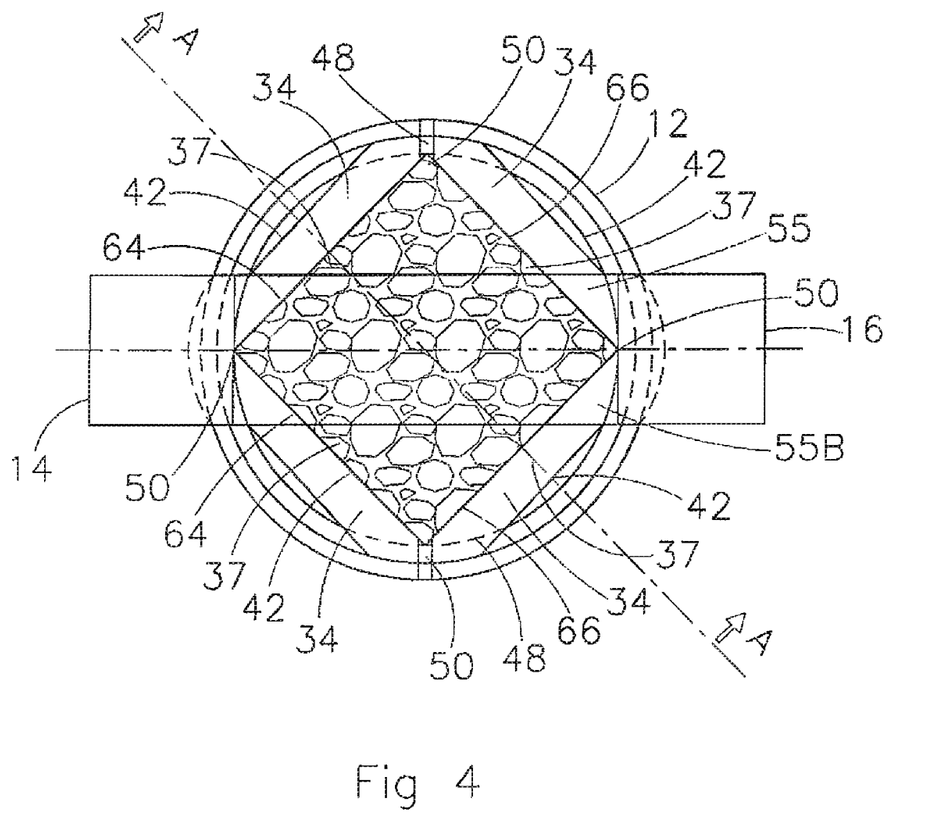
FIG. 4 shows a diagrammatical top view of the device according to the invention.

An air and dirt removal unit 30 is provided inside the housing 12. The air and dirt removal unit 30 comprises a holder 32 which is a cage-like structure having open walls 37. The holder 32 defines a resistance zone 31. The holder 32 has a substantially rhombic shape, as can be seen in FIG. 4. The holder 32 comprises a plurality of air removal members 33. These may be O-rings or be a different form of members. These members are known in the prior art. The air and dirt removal unit is also configured for removing contaminating liquids.

The open walls 37 may be manufactured from wire mesh. The members 33 are made from a metal and have a relatively large surface area, such that in use gasses may attach to the surface of the air removal members 33.

It is also possible that a single air removal element is provided which can be mounted in the housing as a single object, for instance, a spiral form or a form comprising a plurality of spirals.

It is also possible to provide a resistance zone without bubble-forming elements.

As can be seen in FIG. 4, the holder 32 has side walls 37. The side walls 37 define the rhombic shape. The rhombic form has four corners 50. One corner 50 is directed at the supply opening 15. One corner 50 is directed at the discharge opening 17.

Flow guides 34 are provided below the holder 32. Also, flow guides 34 are provided above the holder 32. The flow guides 34 are connected at an upper edge 35 thereof to a lower edge 36 of the holder 32. The flow guides 34 are plate-like structures.

The flow guides 34 below the resistance zone 31 define a bifurcation opening 25 at the underside 27 of the resistance zone 31. The flow guides 34 above the resistance zone define a bifurcation opening 25 at the upper side 29 of the resistance zone 31.

FIG. 4 shows that the flow guides 34 taper. Four openings 42 are defined between a lower edge 38 of the flow guides 34 and the side wall 26. The openings 42 have a form of a gap. The flow guides 34 taper outwardly as can also be see better in FIG. 10, A lower edge 38 of the flow guides 34 is provided at a distance 39 from the bottom side 18 of the housing 12. Between the lower edge 38 and the bottom side 18, a lower quiet zone 40 is defined. Above the upper edge 38 of the upper flow guides 34, an upper quiet zone 40 is defined.

Figure 10:
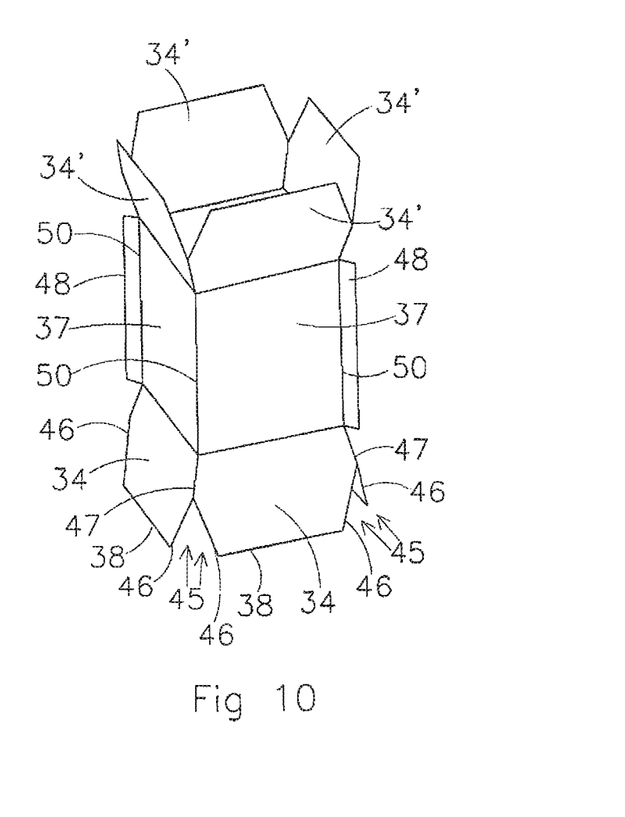
FIG. 10 shows an orthogonal view of a resistance element according to the invention.
Figure 11:
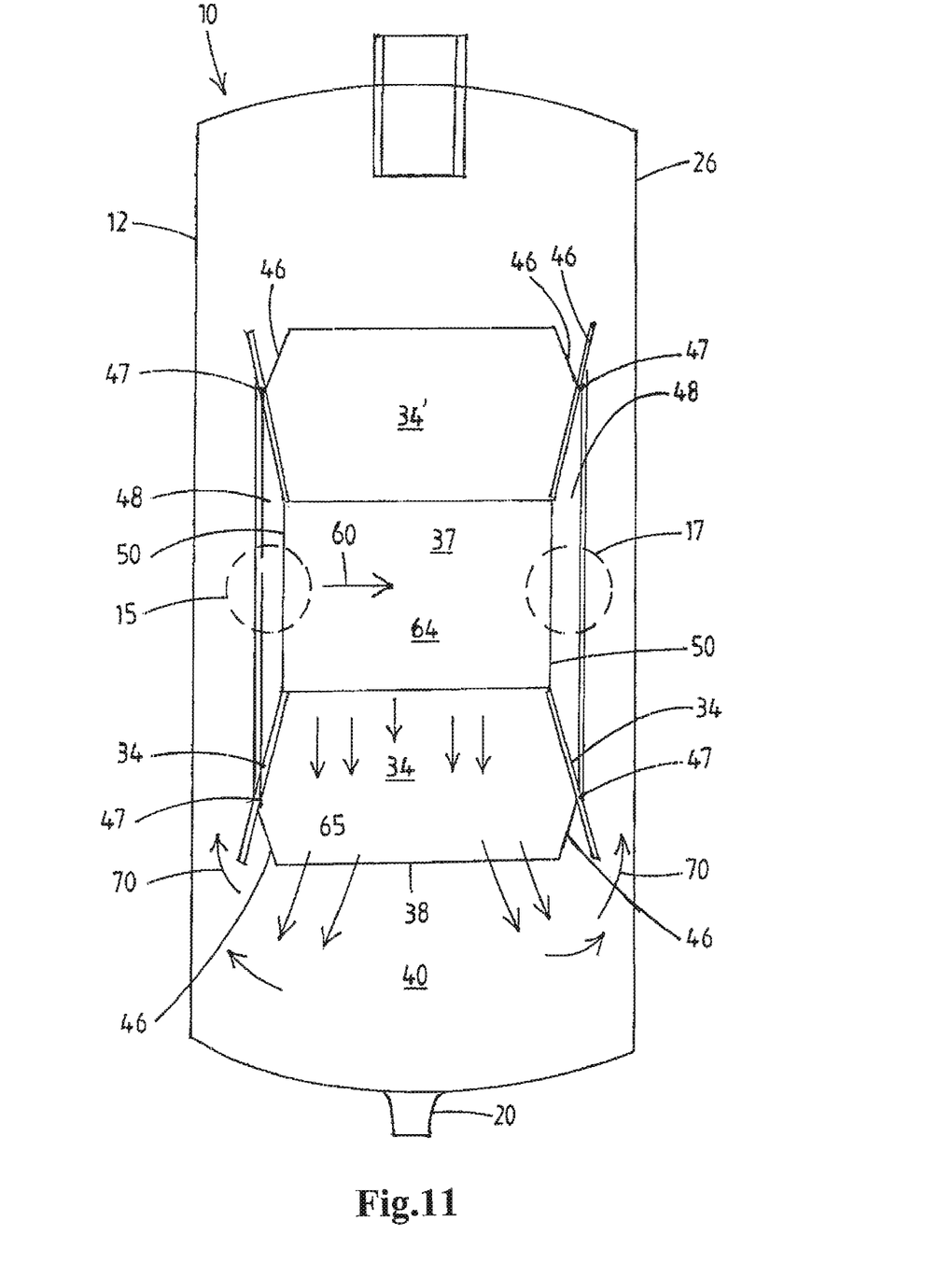
FIG. 11 shows a sectional view taken along the line A-A in FIG. 4.

The flow guides 34 further have cut-off corners 45, resulting in vertical edges 46 which fit to the side wall 26 of the housing 12.

Closure members 48 are provided at corners 50 to prevent any flow from circumventing the resistance zone 31.

The closure members 48 fit with the inner wall 26 of the housing 12. The closure members 48 extend between a lower point 47 where two ridges 46 of flow guides 34 meet and an upper point 47 where two ridges 46 from flow guides 34' meet.

Figure 6:
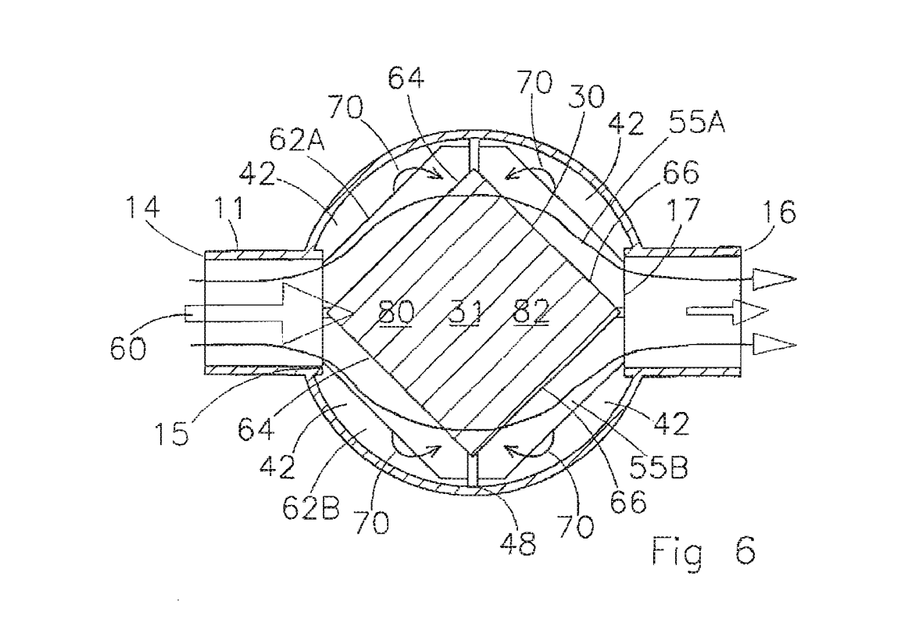
FIG. 6 shows a top view in cross-section of the device according to the invention with flow lines.
Figure 7:
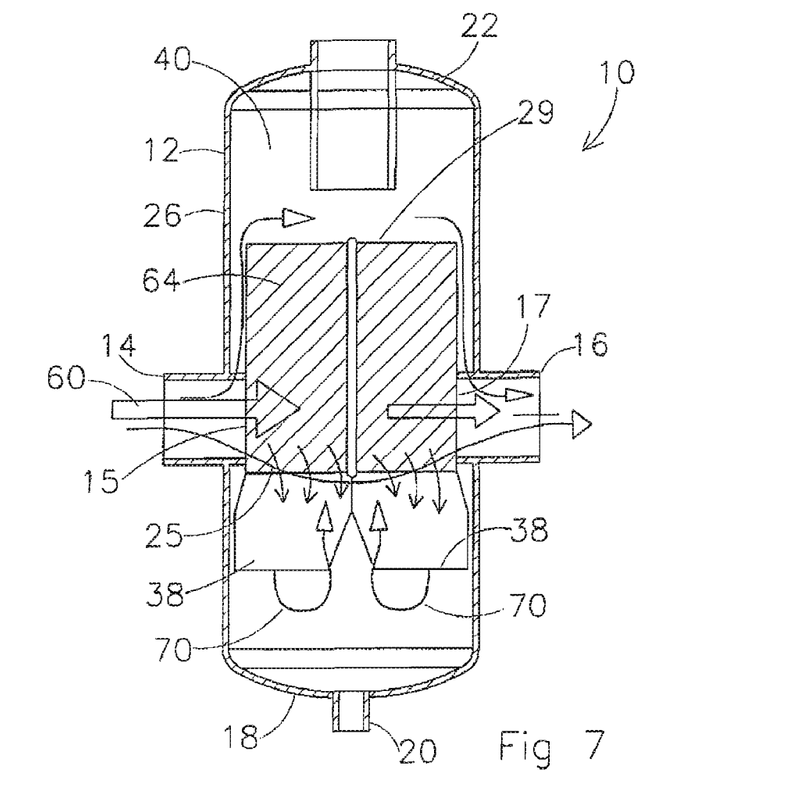
FIG. 7 shows a side view in cross-section of another embodiment of the device according to the invention with flow lines.
Figure 8:
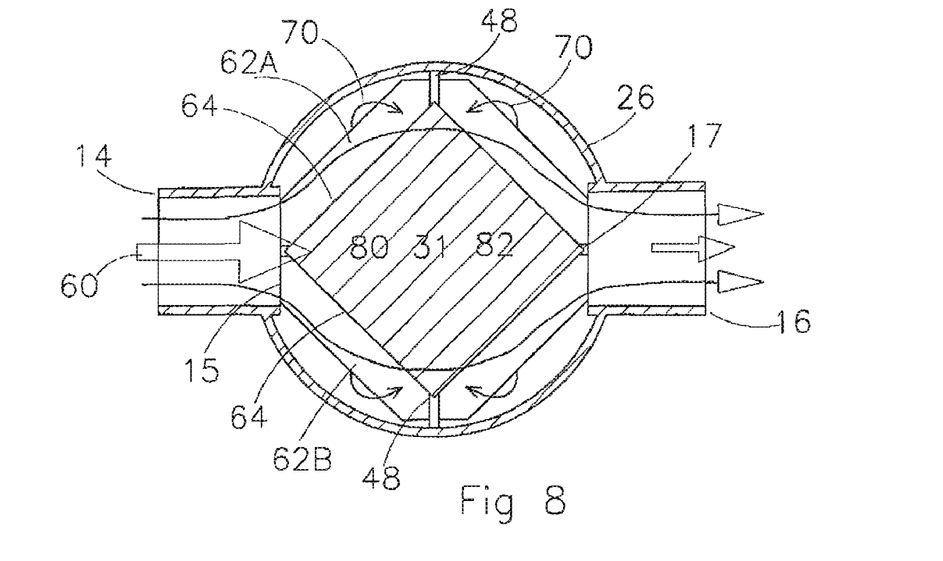
FIG. 8 shows a top view in cross-section of another embodiment of the device according to the invention with flow lines.
Figure 9:
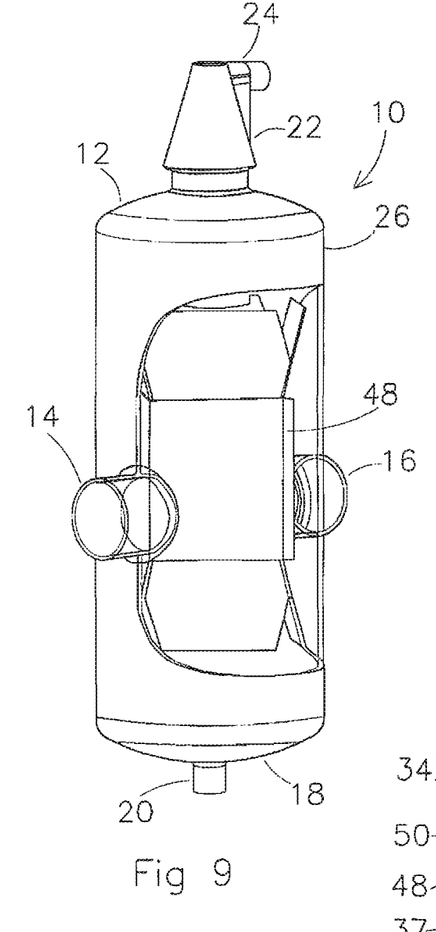
FIG. 9 shows an orthogonal view with partial cut away section of the device according to the invention with flow lines.

A second embodiment is shown in FIGS. 7 and 8. The resistance zone 31 is extended upwards and the low guides 34' are omitted. In top view, the embodiment of FIGS. 7 and 8 is the same as the embodiment of FIGS. 5 and 6. This embodiment has a better air removal function as the embodiment of FIGS. 1-6 because the surface area of the flow through the resistance zone 31 is greater. Thus, the velocity of the liquid inside the resistance zone 31 is lower and the air has more time to form bubbles. Particles of a relatively light contaminating liquid also have time to form bubbles.

Turning to FIGS. 5-8 and 11, the invention is shown when in use. A flow of liquid, indicated by arrow 60, enters the device 10 via the entrance 14. Via the tube 11 and the supply opening 15, the liquid enters the inner space 13 defined by the housing 12.

Figure 5:
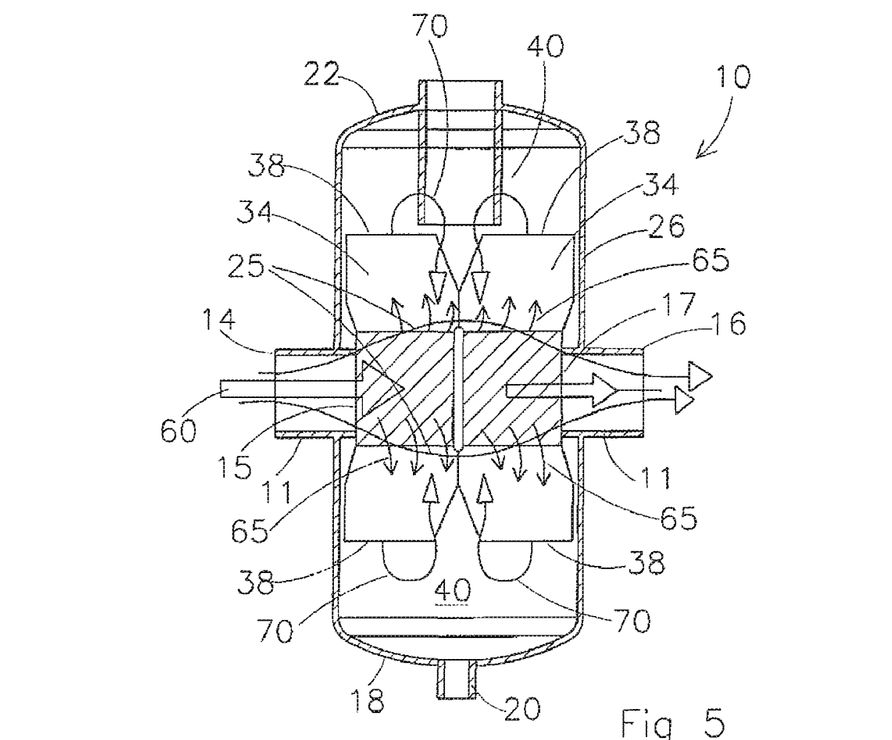
FIG. 5 shows aside view in cross-section of the device according to the invention with flow lines.

Inside the housing 12, the flow widens in a vertical sense as can be seen in FIGS. 5 and 7. In FIGS. 6 and 8, it can be seen that an approach zone 62A, B is present between the supply opening 15 and an entry side 64 of the holder 32. The approach zone 62 comprises a left section 62A and a right section 62B, dividing the flow in a left part and a right part.

The resistance zone 31 comprises a widening part 80 in which the cross-sectional area of the flow increases in the direction of the flow, and a narrowing part 82 in which the cross-sectional area of the flow decreases in the direction of the flow. The widening part 80 is the left part of the rhombic shape and the narrowing part 82 is the right part of the rhombic shape.

Further, a leaving zone 55 is present between an exit side 66 of the resistance zone 31 and the discharge opening 17. The leaving zone also comprises a left part 55A and a right part 55B.

The liquid enters the approach zone 62 through the supply opening 15. From the approach zone 62, the liquid enters the resistance zone 31 defined by the holder 32 through the open wall 37. In the resistance zone 31, the air and other gasses and particles of a relatively light contaminating liquid which are present in the liquid attach to the O-rings 33. The air forms bubbles, which grow. When the bubbles have reached a certain size, they come loose from the O-rings 33 and rise to the upper end 22 of the device 10. The air bubbles eventually leave the device 10 via the valve 24. A floater (not shown) may be present with a lever in order to open the valve 24 when required. These floaters and levers are known in the field of the art.

In the resistance zone 31, a part of the liquid branches off from the main flow 60 and forms a downward flow 65 which is directed downward. The downward flow 65 occurs between the flow guides 34. Thus, the lower flow guides 34 form an annulus which envelops the downward flow 65. In FIGS. 5 and 7, the downward flow 65 is shown with dashed lines in order to distinguish the downward flow 65 from the upward flow 70 and to clarify that the downward flow 65 does not coincide or mix with the upward flow 70, because the flow guides 34 separate the downward flow 65 from the upward flow 70.

The downward flow 65 subsequently enters the quiet zone 40. Here, the velocity of the liquid substantially drops. The liquid substantially comes to a rest. The part of the main flow 60 which is diverted downward into the quiet zone is relatively small. Therefore, the discharge of the diverted flow 65 is relatively small and the velocity of the liquid thus is also relatively small.

In the lower quiet zone 40, dirt particles or particles of a relatively heavy contaminating liquid settle on the bottom 18 of the housing. From there, the dirt parts or particles of a relatively heavy contaminating liquid slide over the bottom wall 18 to the dirt exit 20. In use, the dirt exit 20 will remain closed for a greater portion of time. Periodically, the dirt exit 20 will be opened and the dirt is removed.

In practice, it may not be necessary that all dirt parts or particles of a relatively heavy contaminating liquid are removed from the flow. Generally, liquid conduit systems are closed loop systems, and the liquid will pass through the combined air and dirt remover 10 periodically. If a portion of the dirt parts is removed each time the liquid makes a complete round, then it is also possible to keep the liquid substantially clean.

After passing the quiet zone 40, the flow is directed upwardly and outwardly, toward the side wall 26 of the housing 12. The flow passes through the openings 42 between the flow guides 34 and the side wall 26.

The flow is now an upward flow 70 and flows back to the approach zone 62 and/or the leaving zone 55. Here, the diverted flow merges with the main flow 60.

Because the upward flow merges with the main flow both upstream and downstream of the resistance zone 31, the removal device according to the invention can be installed in both directions. The liquid entrance 14 and the liquid exit 16 are interchangeable.

Because the flow guides 34 control the flow pattern, a calm and stable flow through the quiet zone 40 is created. Turbulence is non-present or limited. The space provided in the housing 12 is effectively divided into a separate entrance and exit of the quiet zone 40.

The part of the diverted flow that merges with the main flow in the leaving zone 55 subsequently leaves the device 10 through the discharge opening 17. The part of the diverted flow that merges with the main flow in the approach zone 62 re-enters the resistance zone 31. A part of the flow may be again diverted into the quiet zone 40 and thus enter the quiet zone 40 for a second time. However, a greater portion of the flow will flow through the resistance zone 31 into the leaving zone 55 and through the discharge opening 17 out of the device 10.

Further, through the bifurcation opening 65 at the upper side of the resistance zone 31, another branch-off flow 65 flows upward. The upper branch-off flow flows into the upper quiet zone 40. Here, the upper branch-of flow comes to rest. Gas bubbles or particles of a relatively light contaminating liquid which are formed in the resistance zone 31 are conveyed with the upper branch-off flow 65 and move upward into the quiet zone. When the liquid comes to rest, the gas bubbles or particles of a relatively light contaminating liquid continue to rise due to their buoyancy and move toward the upper end 22 and gas exit 24 of the removal device 10.

Figure 12:
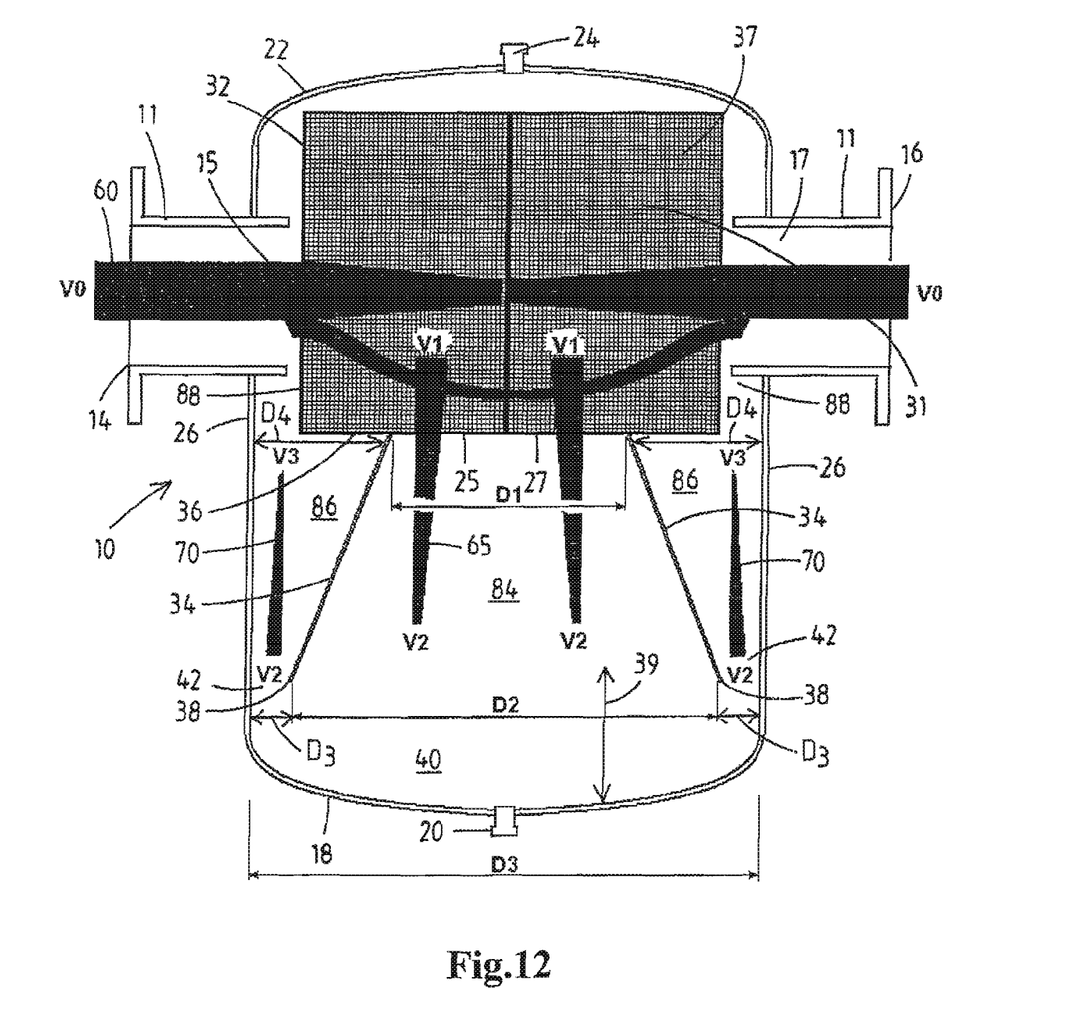
FIG. 12 provides a detailed side view of the liquid flow inside the device of the invention.

Turning to FIG. 12, the tapering arrangement of the flow guides 34 is shown. At the lower side 27 of the resistance zone 31, the bifurcation opening 25 is defined. The bifurcation opening 25 has a diameter D1. The flow guides 34 taper outwardly in the direction of the branch-off flow 65 and defines a downward flow section 84. At the lower edge 38 of the flow guides 34, the downward flow section has a diameter D2, which is substantially greater than D1. This outward tapering causes the velocity of the flow 65 to decrease, resulting in a low velocity in the quiet zone. Thus, dirt particles or particles of a relatively heavy contaminating liquid may settle.

In a return flow section 86, a same effect is created. The return openings 42 are relatively narrow and define a return flow section 86 having a diameter D3. At the upper end of the return flow section 86 the return flow section 86 has a diameter D4 which is substantially greater than the diameter D3. Here, the merge point 88 is defined. The return flow section 85 has an annular shape.

It will be clear to a skilled person that other forms of flow guides are also possible. For instance, a conical tube could also be used instead of the four plates which are shown.

It is also possible to construct the removal device in such a way that the return flow merges with the main flow only downstream of the resistance zone. This would lead to better hydraulic behaviour, but make the removal device sensitive to wrong installation. If the liquid entrance 14 and the liquid exit 16 would be exchanged by mistake during installation, the removal device would substantially worse than it should.

The bottom quiet zone is a compartment which is substantially separated from the resistance zone by the bottom wall of the resistance zone. The upper quiet zone is a compartment which is substantially separated from the resistance zone by an upper wall of the resistance zone.

Figure 13:
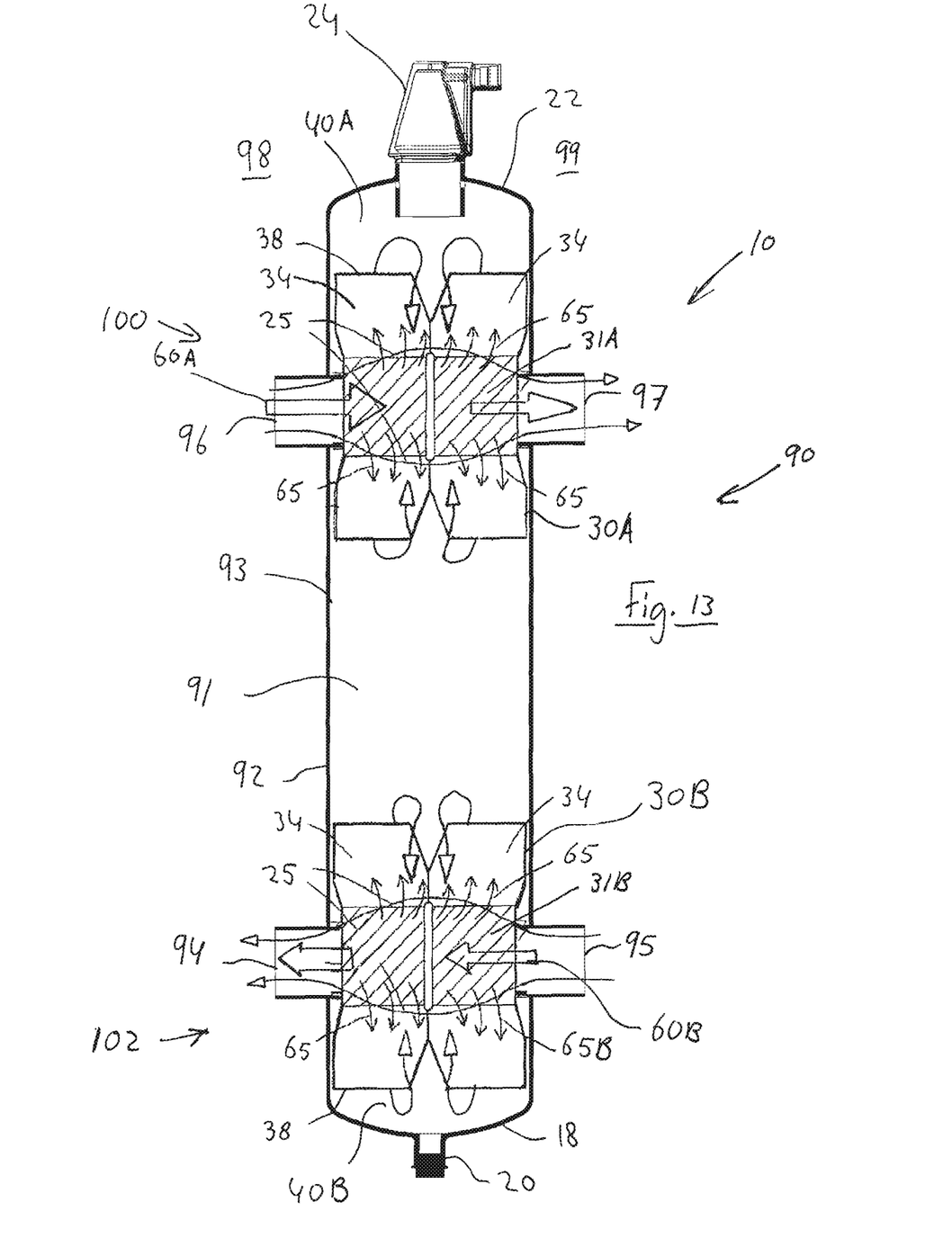
FIG. 13 shows a side view in cross-section of another embodiment of the invention.

Turning to FIG. 13, another embodiment of the invention is shown. This air, dirt and contaminating liquid removal device 10 is integrated with a hydraulic separator 90. The hydraulic separator 90 is to be fitted between a primary liquid circuit (not shown) and a secondary liquid circuit (not shown), in such a manner that the first and secondary liquid circuits are hydraulically independent. The hydraulic separator 90 has an elongate, preferably vertically positioned body 92 with an internal space 91 which is delimited by a wall 93.

The air, dirt and contaminating liquid removal device 10 comprises a first supply opening 96 constructed to be connected to a primary liquid circuit (not shown), and a first discharge opening 97 constructed to be connected to a secondary liquid circuit (not shown).

The air, dirt and contaminating liquid removal device 10 further comprises a second discharge opening 94 configured to be connected to the primary liquid circuit and a second supply opening 95 configured to be connected to the secondary liquid circuit.

The first supply opening 96 and the second discharge opening 94 are located substantially on one longitudinal side 98 of the hydraulic separator 90. The first discharge opening 97 and the second supply opening 95 are located substantially on an opposite longitudinal side 99 of the hydraulic separator 90.

The first supply opening 96 and the first discharge opening 97 are located at a first height region 100 of the hydraulic separator 10. The second discharge opening 94 and the second supply opening 95 are located substantially at a second, different height region 102 of the hydraulic separator 90.

In the first region 100, a first air and dirt removal unit 30A is provided which is substantially the same as the air and dirt removal unit 30 of the embodiment of FIGS. 1-4, 9 and 10. Above the first air and dirt removal unit 30A, a first quiet zone 40A is provided for the removal of air, gas and particles of a relatively light contaminating liquid via the air outlet 24.

In the second region 102, a second air and dirt removal unit 30B is provided which is substantially the same as the air removal unit 30 of the embodiment of FIGS. 1-4, 9 and 10. Below the second air and dirt removal unit 30B, a second quiet zone 40B is provided for the removal of dirt or particles of a relatively heavy contaminating liquid.

In use, a first flow 60A will flow through the first resistance zone 31A. In the first resistance zone 31A, air and other gasses or particles of a relatively light contaminating liquid which are present in the liquid attach to the O-rings 33. The air forms bubbles, which grow. When the bubbles have reached a certain size, they come loose from the O-rings 33. Through the bifurcation opening 65 at the upper side of the first resistance zone 31A, a branch-off flow 65 flows upward into the first quiet zone 40A. Here, the upper branch-off flow comes to rest. Gas bubbles or bubbles of a light contaminating liquid which are formed in the first resistance zone 31A are conveyed with the upper branch-off flow 65 and move upward into the first quiet zone 40A and to the air outlet 24.

A second flow 60B will flow through the second resistance zone 31B, and a second branch flow 65B will flow into the second quiet zone 40B. Dirt or particles of a relatively heavy contaminating liquid will settle in the second quiet zone 40B and may be removed via the dirt outlet 20.

It will be obvious to a person skilled in the art that numerous changes in the details and the arrangement of the parts may be varied over considerable range without departing from the spirit of the invention and the scope of the claims.

The invention claimed is:

1. A removal device for removing gas and/or dirt and/or particles of a contaminating liquid from a liquid in a liquid conduit system, the removal device comprising:
    a housing which defines an inner space;
    a supply opening and a discharge opening in the housing;
    a resistance zone in the inner space comprising an entrance and an exit and one or more flow resistance members, which resistance zone in use provides a hydraulic resistance to a main flow which flows from the supply opening through the resistance zone to the discharge opening;
    at least one quiet zone in the inner space in which in use the liquid has a substantially smaller velocity than in the resistance section, the quiet zone being configured to allow:
    dirt or particles of a relatively heavy contaminating liquid to settle on a bottom of the housing, and/or
    gas bubbles or particles of a relatively light contaminating liquid to rise to an upper end of the housing;
    at least one bifurcation opening in the resistance zone, the bifurcation opening being in liquid communication with the quiet zone and providing entry for a branch-off flow into the quiet zone; and
    at least one return opening between the quiet zone and a merge point in the main flow upstream and/or downstream from the resistance zone, the return opening allowing a return of the branch flow into the main flow, such that in use the branch-off flow enters the quiet zone through the bifurcation opening, substantially comes to rest in the quiet zone in order to allow dirt or particles of a relatively heavy contaminating liquid to settle or gas bubbles or particles of a relatively light contaminating liquid to rise and subsequently returns into the main flow at the merge point through the return opening.

2. The removal device of claim 1, comprising both:
    a quiet zone for dirt removal or removal of a heavy contaminating liquid and
    a quiet zone for gas removal or removal of a light contaminating liquid, wherein a single resistance zone is provided for both the quiet zone for dirt removal or removal of a heavy contaminating liquid and the quiet zone for gas removal or removal of a light contaminating liquid.

3. The removal device of claim 2, wherein the quiet zone for dirt removal or removal of a heavy contaminating liquid is located under the resistance zone and wherein the quiet zone for gas removal or removal of a light contaminating liquid is located above the resistance zone.

4. The removal device of claim 1, wherein one or more flow guides are provided in the housing which define the at least one bifurcation opening and the at least one return opening and which substantially determine a flow pattern of the liquid through the one or more quiet zones.

5. The removal device of claim 4, wherein the one or more flow guides define a separate bifurcation opening and at least one separate return opening.

6. The removal device of claim 4, wherein the one or more flow guides are plates which are mounted in the inner space.

7. The removal device of claim 4, comprising a quiet zone for dirt removal or removal of a heavy contaminating liquid, wherein the one or more flow guides in the quiet zone define:
    one or more downward flow sections which start at the bifurcation point and in which the flow is directed downward; and
    one or more upward flow sections which in use have an upward flow and which end at the merge point,
    in such a way that in use the liquid enters the quiet zone for dirt removal or removal of a heavy contaminating liquid through the downward flow section and exits the quiet zone for dirt removal or removal of a heavy contaminating liquid through the upward flow section.

8. The removal device of claim 4, comprising a quiet zone for the rising of gas bubbles or rising of particles of a light contaminating liquid, wherein the one or more flow guides in the quiet zone define:
    one or more upward flow sections which start at the bifurcation point and which in use have an upward flow; and
    one or more downward flow sections which in use have a downward flow and which end at the merge point,
    in such a way that in use the liquid enters the quiet zone for the rising of gas bubbles or rising of particles of a light contaminating liquid through the upward flow section, comes to rest in the quiet zone and subsequently exits the quiet zone through the downward flow section.

9. The removal device of claim 4, wherein when viewed from above the one or more return openings substantially form an annulus which extends substantially around the bifurcation opening, wherein the flow guides separate the one or more return openings from the bifurcation opening.

10. The removal device of claim 4, wherein:
    the one or more flow guides of the quiet zone for dirt removal or removal of a heavy contaminating liquid have a lower edge which is located at a distance from a bottom of the housing, such that the quiet zone is defined below the lower edge of the one or more flow guides and/or
    the one or more flow guides of the quiet zone for the rising of gas bubbles or rising of particles of a light contaminating liquid have an upper edge which is located at a distance from an upper end of the housing, such that the quiet zone for the bubbles is defined above the upper edge of the one or more flow guides.

11. The removal device of claim 4, wherein the one or more flow guides define an entrance flow section from the bifurcation point into the quiet zone, wherein the cross-sectional area of the entrance flow section increases in the direction of flow.

12. The removal device of claim 4, wherein the one or more flow guides define one or more return flow sections from the quiet zone to the merge point, wherein the cross-sectional area of the one or more return flow section increases in the direction of flow.

13. The removal device of claim 4, wherein the flow guides are plates which taper outwardly from the bifurcation point in the direction of flow.

14. The removal device of claim 4, wherein the flow guides define:
    the bifurcation opening into the quiet zone for dirt removal or removal of a heavy contaminating liquid at an underside of the resistance zone; and/or
    the bifurcation opening into the quiet zone for the rising of gas bubbles or rising of particles of a light contaminating liquid at an upper side of the resistance zone.

15. The removal device of claim 4, wherein the one or more flow guides define at least one return opening between an edge of the flow guide and a side wall of the housing.

16. The removal device of claim 1, wherein in the inner space:
- an approach zone is defined between the supply opening and the resistance zone by a wall of the housing and an entry side of the resistance zone, in which approach zone in use the liquid approaches the resistance zone; and
- a leaving zone is defined between the resistance zone and the discharge opening by a wall of the housing and an exit side of the resistance zone, in which leaving zone in use the liquid flows away from the resistance zone,
- wherein the cross-sectional flow area in the approach zone and/or in the leaving zone is smaller than in the resistance zone, such that in use the velocity of the liquid in the approach zone and the leaving zone is greater than the velocity in the resistance zone, resulting in a higher hydrostatical pressure in the resistance zone than in the approach zone and/or the leaving zone.

17. The removal device of claim 1, wherein when viewed from above the resistance zone comprises:
- a widening part in which the cross-sectional area of the flow increases in the direction of the flow; and
- a narrowing part in which the cross-sectional area of the flow decreases in the direction of the flow.

18. The removal device of claim 1, wherein when viewed from above the resistance zone is substantially rhombic, wherein one corner of the rhombus form is substantially directed at the supply opening and another corner is substantially directed at the discharge opening.

19. The removal device of claim 1, wherein the one or more resistance members are bubble-forming members which comprise a relatively large surface area onto which gasses in the liquid may attach and form bubbles.

20. The removal device of claim 1, comprising a plurality of return openings, wherein at least one return opening is provided upstream of the bifurcation point and wherein at least one return opening is provided downstream of the bifurcation point.

21. The removal device of claim 1, comprising one or more return openings, wherein the one or more return opening is only provided downstream of the bifurcation point.

22. The removal device of claim 1, being integrated with a hydraulic separator, the removal device comprising:
- a first supply opening which is configured to be connected to a primary liquid circuit;
- a first discharge opening which is configured to be connected to a secondary liquid circuit;
- a second discharge opening which is configured to be connected to the primary liquid circuit;
- a second supply opening which is configured to be connected to the secondary liquid circuit;
- a first resistance zone positioned between the first supply opening and the first discharge opening, which first resistance zone in use provides a hydraulic resistance to a main flow which flows from the first supply opening through the first resistance zone to the first discharge opening; and
- a second resistance zone positioned between the second supply opening and the second discharge opening, which second resistance zone in use provides a hydraulic resistance to a main flow which flows from the second supply opening through the second resistance zone to the second discharge opening,
- wherein at least one first quiet zone is provided above the first resistance zone for allowing gas bubbles or particles of a light contaminating liquid to rise to an upper end of the housing, and
- wherein at least one second quiet zone is provided below the second resistance zone for allowing dirt or particles of a heavy contaminating liquid to settle on a lower end of the housing.

23. The removal device according to claim 1, wherein said resistance zone is formed by the resistance element comprising:
- one or more resistance members which define the resistance zone; and
- one or more flow guides which define a bifurcation point from the resistance zone, wherein when the resistance element is inside the removal device, the flow guides define at least one quiet zone in conjunction with the wall of the removal device, the quiet zone having a separate entrance and a separate exit.

24. A method for removing air and/or particles of a relatively light contaminating liquid from a liquid in a liquid conduit system and/or removing dirt and/or particles of a relatively heavy contaminating liquid from the liquid in the liquid conduit system, the method comprising the steps of:
a) providing a removal device comprising:
- a housing which defines an inner space;
- a supply opening and a discharge opening in the housing;
- a resistance zone in the inner space comprising an entrance and an exit and one or more flow resistance members, which resistance zone in use provides a hydraulic resistance to a main flow which flows from the supply opening through the resistance zone to the discharge opening;
- at least one quiet zone in the inner space in which in use the liquid has a substantially smaller velocity than in the resistance section, the quiet zone being configured to allow dirt or particles of a relatively heavy contaminating liquid to settle on a bottom of the housing, and/or gas bubbles or particles of a relatively light contaminating liquid to rise to an upper end of the housing;
- at least one bifurcation opening in the resistance zone, the bifurcation opening being in liquid communication with the quiet zone and providing entry for a branch-off flow into the quiet zone; and
- at least one return opening between the quiet zone and a merge point in the main flow upstream and/or downstream from the resistance zone, the return opening allowing a return of the branch flow into the main flow, such that in use the branch-off flow enters the quiet zone through the bifurcation opening, substantially comes to rest in the quiet zone in order to allow dirt or particles of a relatively heavy contaminating liquid to settle or gas bubbles or particles of a relatively light contaminating liquid to rise and subsequently returns into the main flow at the merge point through the return opening; and
b) guiding a flow of liquid through the removal device.

* * * * *